Oct. 6, 1970     T. W. HALL II     3,532,872
CONCEALED HEADLAMP ARRANGEMENT
Filed June 10, 1968     2 Sheets-Sheet 1

INVENTOR.
Thomas W. Hall
BY
Herbert Furman
ATTORNEY

INVENTOR.
Thomas W. Hall II
BY Herbert Furman
ATTORNEY

United States Patent Office 3,532,872
Patented Oct. 6, 1970

3,532,872
CONCEALED HEADLAMP ARRANGEMENT
Thomas W. Hall II, Pontiac, Mich., assignor to General Motors Corporation, Detroit, Mich., a corporation of Delaware
Filed June 10, 1968, Ser. No. 735,767
Int. Cl. B60q 1/06
U.S. Cl. 240—7.1                    4 Claims

ABSTRACT OF THE DISCLOSURE

A headlamp assembly is pivotally mounted on a shaft on the vehicle body for pivotal movement between open and closed positions. The shaft mounts a spur gear which meshes with a sector gear pivoted to the body. The sector gear includes a crank arm having a radial slot. An actuator is mounted on the body and has a slotted output arm. A pin mounted on a triangular link engages the slots to connect the arms. A pair of links are pivotally mounted at spaced points on the body and are each pivoted to the triangular link. The actuator is energizable to move the headlamp assembly between open and closed positions, in which positions the links cooperate to lock the crank arm against movement by forces on the headlamp assembly.

---

This invention relates to a concealed headlamp arrangement.

Many production vehicles feature concealed headlamps which are moved between open and closed positions. To insure accurate aiming of the headlamps and prevent any movement caused by vibration or wind flutter, some means is required for locating the headlamps in the open position. Conventional arrangements provide for moving the headlamp assembly against a stop where it is held by the actuator.

This invention provides a concealed headlamp assembly wherein the headlamps are held in the open and closed positions independently of the actuator.

One object of this invention is to provide a concealed headlamp assembly driven by a crank arm and linkage means for locking the crank arm in extreme positions against movement by a force on the headlamp assembly. Another object is to provide headlamp concealing means driven by an actuator-powered crank arm with means for locking the crank arm in both open and closed positions against movement by a force on the concealing means, while permitting crank arm movement by the actuator. A further object is to provide a linkage having a pin and slot connection with the crank arm and which is operable in the open and closed position of the concealing means to lock the arm against movement by a force exerted on the crank arm other than by the actuator.

These and further objects of this invention will become readily apparent upon reference to the following detailed description of the annexed drawings in which.

Figure 1:
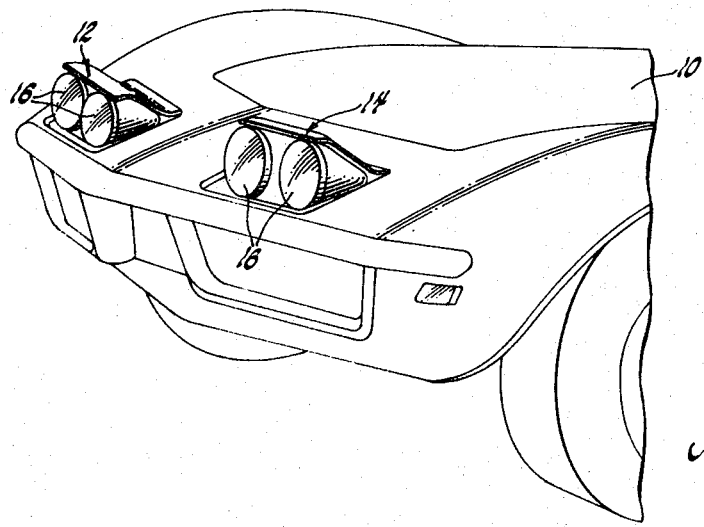
FIG. 1 is a partial perspective view of a portion of a vehicle body front end having a concealed headlamp arrangement according to this invention, with the headlamps shown in open position.
Figure 2:
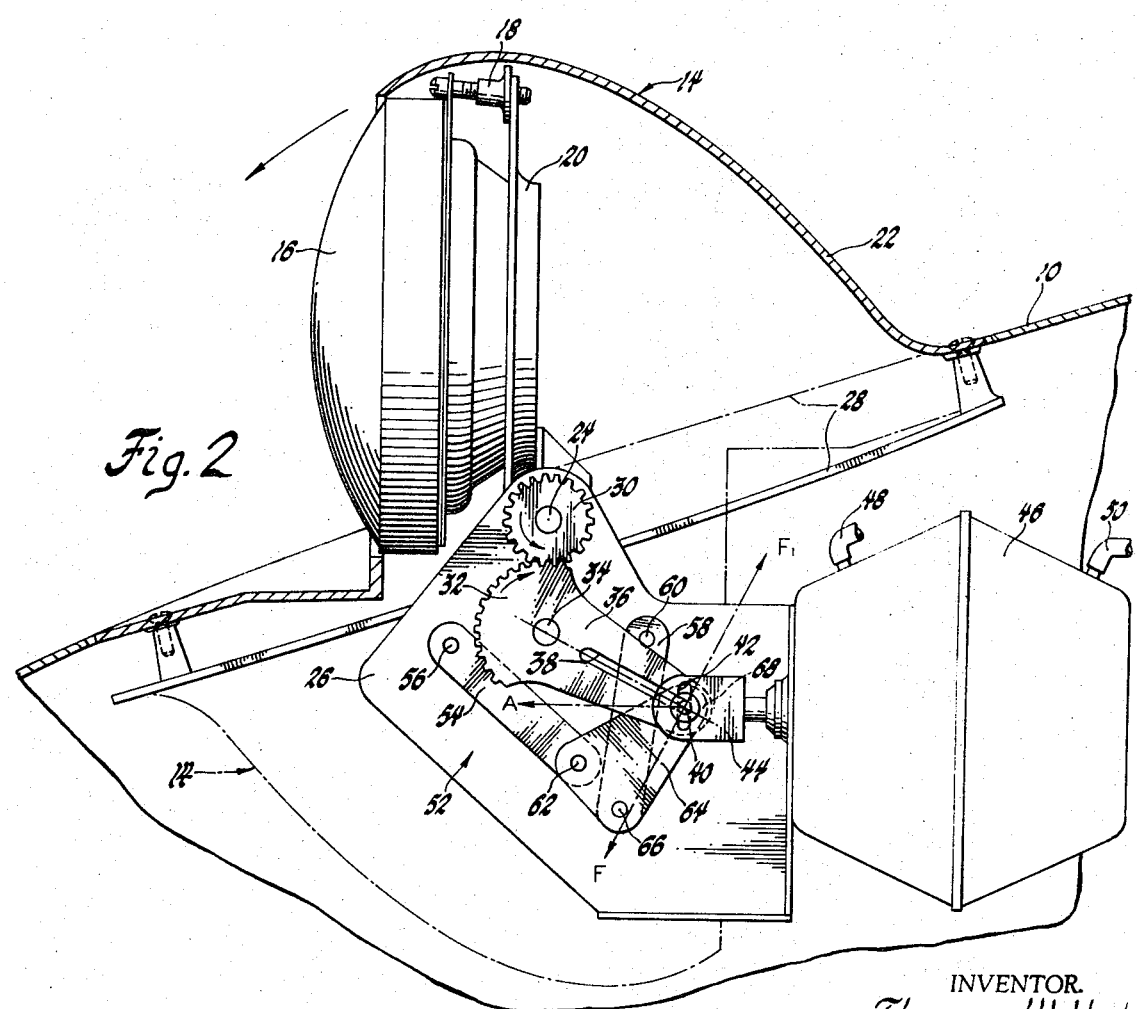
FIG. 2 is a partially broken away enlarged side elevational view of the concealed headlamp arrangement showing a locking linkage therefor according to this invention, with the headlamps shown in open position and the linkage in locked position.

Referring now to FIGS. 1 and 2 of the drawings, a vehicle body 10 is provided wtih a pair of headlamp assemblies 12 and 14, each of which includes a pair of headlamps 16. The assemblies 12 and 14 are retractable within the body to conceal the headlamps when they are not in use. The headlamp assemblies 12 and 14 and the means for retracting them are substantially identical and therefore detailed reference will be made only to the right hand assembly 14.

The headlamps 16 are adjustably mounted at 18 to a mounting plate 20 affixed within a housing 22 of the assembly. Plate 20 is rigidly mounted to a shaft 24 that is rotatably secured at both sides to a body mounting bracket 26. The assembly 14 is rotatable 180° from an open exposed position, shown in solid lines in FIGS. 1 and 2, counterclockwise about the shaft axis to a closed concealed position, shown in phantom lines in FIG. 2. In this position, a cover panel 28 secured to housing 22 lies flush with the contour of body 10 to conceal the headlamps.

A spur gear 30 is rigidly counted on shaft 24 and is drivingly engaged by a sector 32 that is pivoted at 34 to bracket 26. Sector 32 includes a crank arm 36 having an elongated slot 38 that confines a connecting member or pivot pin 40. Pin 40 is also confined within a vertical slot 42 formed in the end of output arm 44 of an actuator 46, thus pivotally interconnecting arms 36 and 44. Actuator 46 is mounted on bracket 26 and is preferably a conventional differential pressure diaphragm type vacuum motor, having connections 48 and 50 to the engine manifold, not shown, and to the atmosphere.

It is desirable to immovably locate headlamp assembly 14 in both the open and closed positions to assure accurate headlamp aim and to preclude any movement by wind or vibration. A locking linkage 52 is provided for this purpose. As shown in FIG. 2, linkage 52 includes a forward control link 54, pivoted at 56 to bracket 26, and a rear control link 58 pivoted at 60 to bracket 26. The free end of link 54 is pivoted at 62 to one apex of a triangular connecting link 64, while the free end of link 58 is pivoted at 66 to a second apex of link 64. The third apex 68 of link 64 rigidly mounts the pin 40, thus interconnecting linkage 52 with the crank arm 36.

When the headlamps 16 are in their fully open position of FIG. 2, linkage 52 is locked to prevent movement of the headlamps to closed position, as will now be described.

In the open position, pin 40 engages the outer end of slot 38. Any force tending to close headlamp assembly 14, or rotate it counterclockwise, tends to pivot arm 36 clockwise about pivot 34. As shown in FIG. 2, this imparts a force F, perpendicular to a line extending through pivot 34 and pin 40, on connecting link 64. In this position, the line of force F falls below pivot 66, tending to rotate link 64 clockwise about pivot 66, which forces pin 40 against the outer end of slot 38. Since the pins cannot move, crank arm 36 is immobilized and headlamp assembly 14 cannot move.

Overtravel of headlamp assembly 14 to open position is similarly prevented. A force tending to further open assembly 14 tends to rotate crank arm 36 counterclockwise. The resultant force F' on link 64 tends to rotate the link counterclockwise about pivot 66 and to rotate link 58 counterclockwise about pivot 60. However, link 54 prevents counterclockwise movement of both links 58 and 64, thus holding pin 40 against the outer end of slot 38 and preventing further opening movement of headlamp assembly 14.

Figure 3:
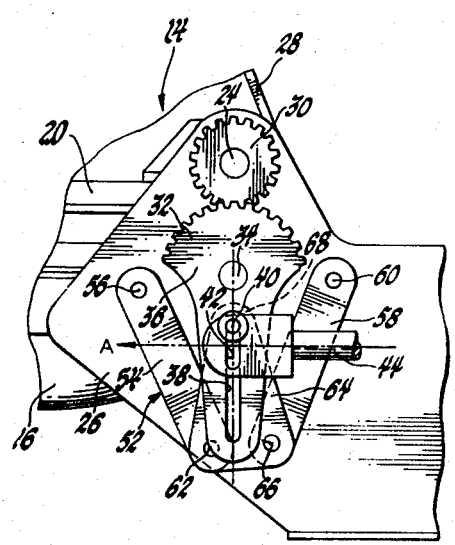
FIG. 3 is a detail view of the linkage of FIG. 2, with the linkage shown in intermediate unlocked position corresponding to headlamp partially open position.
Figure 4:
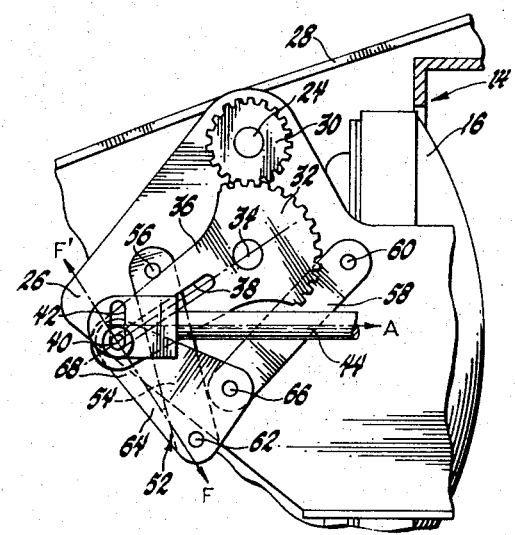
FIG. 4 is a view similar to FIG. 3, showing the linkage in a locked position corresponding to headlamp closed position.

Thus, linkage 52, in cooperation with pin and slot 40, 38, positively locks crank arm 36 so that headlamp assembly 14 cannot be moved by exerting force on it. However, actuator 46 can move the crank arm to rotate the headlamp assembly, since the horizontal force A exerted by arm 44 on linkage 52 pivots link 64 counterclockwise about pivot 66. This rocks link 64 on pivots 62 and 66, pivoting links 54 and 58 clockwise, as shown in FIG. 3, and moves pin 40 inwardly of slot 38. Crank arm 36 can then rotate gear 30 and move the headlamp assembly 14. The actuator arm 44 moves the elements to the closed position of FIG. 4, where linkage 52 also locks the headlamp assembly 14, as will now be described.

In this position, pin 40 is located at the outer end of slot 38. Overtravel of assembly 14 is prevented by the linkage, since the force tending to further close assembly 14 rotates crank arm 36 further clockwise. The resultant force F' tends to move link 64 further clockwise about pivot 62 and to rotate link 54 clockwise about pivot 62. However, link 58 prevents clockwise movement of both links 54 and 64, thus holding pin 40 against the outer end of slot 38 and preventing further opening movement of headlamp assembly 14.

Also, in this position, a force tending to open headlamp assembly 14 tends to rotate crank arm 36 counterclockwise. The line of force F exerted by the crank arm on link 64 falls below pivot 62 and tends to pivot link 64 counterclockwise thereabout. This moves pin 40 against the end of slot 38 to immobilize crank arm 36.

However, upon movement of arm 44 to the right, force A on pin 40 pivots link 64 clockwise about pivot 62 to enable the pin to move inwardly of slot 38. This rotates arm 36 counterclockwise to rotate gear 30 and the headlamp assembly 14 clockwise. The headlamp assembly 14 is then moved from closed to open position, where crank arm 36 is again locked by linkage 52, as described above.

An alternate embodiment of the invention will now be described, with reference to FIGS. 5 and 6. All the elements are identical to those in the FIGS. 2 through 4 embodiment, except that the slot 38' in crank arm 36 is somewhat shortened. The gearing is changed to correspond the open and closed positions of assembly 14 to the FIGS. 5 and 6 positions of linkage 52 to reduce total travel of the linkage and actuator arm 44. It has been found that with this arrangement, linkage 52 will also effectively lock the headlamp assembly in the open and closed positions. In these positions, pin 40 is located at the outer end of shortened slot 38' to preclude overtravel as in the previously described embodiment.

Figure 5:
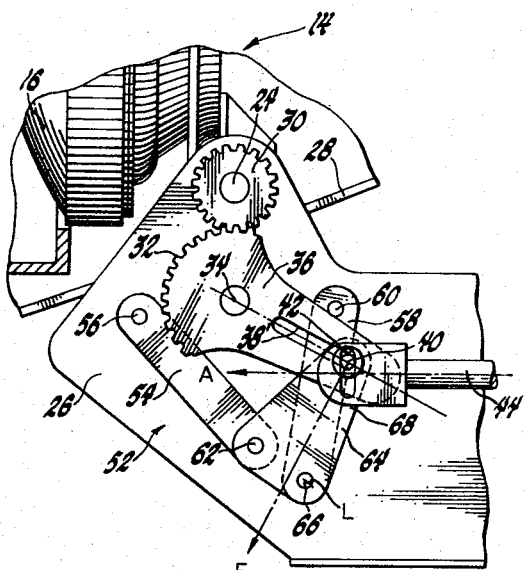
FIG. 5 is a view similar to FIG. 4 showing an alternate embodiment of the linkage of this invention, wherein the linkage is shown in a locked position corresponding to headlamp open position.
Figure 6:
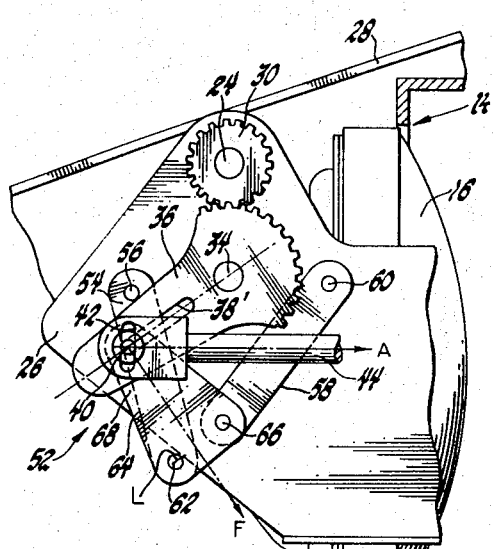
FIG. 6 is a view similar to FIG. 5, showing the linkage in a locked position corresponding to headlamp closed position.

In the FIGS. 5 and 6 positions, the force F exerted on the linkage 52 by arm 36, due to attempted rotation of assembly 14, falls between pivots 62 and 66. In the FIG. 5 position, this tends to rotate link 64 counterclockwise, while in the FIG. 6 position, this tends to rotate the link clockwise. However, in these positions, the force F acts at a very short lever arm L measured from the respective pivots 62 and 66 perpendicular to the line of force F. It has been found that the torque F×L on link 64 is insufficient to produce enough reactive force on pin 40 to overcome the friction exerted on the pin by the angled slots 38' and 42. This locks the crank arm and headlamp assembly against movement. Although locked in the open and closed positions by linkage 52, assembly 14 is readily movable by actuator arm 44, as in the FIGS. 2 through 4 embodiment.

Thus, this invention comprises a crank arm driven retractable headlamp assembly having a locking linkage which locks the crank arm and the assembly in both the open and closed positions to preclude movement out of these positions by forces acting on the headlamp assembly, while readily enabling such movement by the actuator.

It is readily apparent that this invention could be applied to a vehicle body having fixed headlamps and movable concealing panels. While only two embodiments of this invention have been shown and described, modifications thereof are contemplated within the scope of this invention.

I claim:

1. In a vehicle body having a headlamp closure mounted thereon for movement between open and closed positions by a power actuator, the combination comprising: a crank arm lever pivoted to the body and operatively connected to the closure for moving the closure between its positions, a locking link, pin and slot means interconnecting the locking link, the crank arm lever and the actuator, and a control link pivotally interconnecting the locking link and the body, the pin engaging a closed end of the slot in one position of the closure, forcible movement of the closure toward the other position thereof causing the crank arm lever to exert a force on the locking link tending to rotate the locking link about its pivot to the control link in a direction holding the pin in engagement with the slot end and tending to move the control link about its pivot to the body in one direction permitting movement of the crank arm lever, and means blocking such movement of the control link in the one direction to maintain the closure in its one position, the actuator being operable to exert a force on the pin tending to rotate the locking and control links in another direction to move the pin away from the slot end and enable movement of the crank arm lever and the closure toward the other position, the blocking means permitting such movement in the other direction.

2. In a vehicle body having a headlamp closure mounted thereon for movement between open and closed positions by a power actuator, the combination comprising: a crank arm lever pivoted to the body and operatively connected to the closure for moving the closure between its positions, a locking link, pin and slot means interconnecting the locking link, the crank arm lever and the actuator, and a control link pivotally interconnecting the locking link and the body, the pin engaging a closed end of the slot in one position of the closure, forcible movement of the closure beyond the one position causing the crank arm lever to exert a force on the locking link tending to rotate the locking link about its pivot to the control link in one direction moving the pin away from the slot end and tending to move the control link about its pivot to the body in a direction permitting movement of the crank arm lever, and means blocking movement of the control link in the one direction to maintain the closure in its one position.

3. In a vehicle body having a headlamp closure mounted thereon for movement between open and closed positions by a power actuator, the combination comprising: a pair of spaced control links pivoted to the body, a locking link pivotally interconnecting the control links, and pin and slot means operatively interconnecting the closure, the actuator and the locking link, the actuator positioning the pin in engagement with a closed end of the slot in the open and closed positions of the closure and moving the pin in the slot during movement therebetween, forcible movement of the closure from either position toward the other position causing the crank arm to exert a force on the pin tending to rotate the locking link about its pivot to one of the control links in a direction holding the pin against the slot end, the other control link blocking movement of the one control link to block movement of the closure toward the other position, the actuator being operable to exert a force on the pin tending to rotate the locking link and the one control link in another direction moving the pin away from the slot end, the other control link swinging about its body pivot to permit such movement and enable movement of the closure toward the other position.

4. In a vehicle body provided with a concealed headlamp arrangement wherein a headlamp is adapted to be revealed and concealed by opening and closing concealing means by movement of a crank arm pivoted to the body which is driven by a power actuator, the improvement comprising: locking linkage means including a pair of spaced control links pivoted to the body, a locking link pivotally interconnecting the control links, and pin and slot means operably interconnecting the actuator, crank arm and locking means and including a slot formed in the actuator, a slot formed in the crank arm, and a pin mounted on the locking link and pivotally and slidably received within the slots, the pin and slot means moving the locking linkage means in a closing direction upon movement of the crank arm by the actuator from open to closed position of the concealing means and in an opening direction upon movement of the crank arm by the actuator from closed to open positions of the concealing means, the actuator positioning the pin in engagement with a closed end of the crank arm slot, the control links locating the locking link in a locking position in the open and closed positions, movement of the crank arm by the concealing means in the open position moving the locking linkage means in the opening direction to block movement of the pin away from the crank arm slot end, movement of the crank arm by the concealing means in the closed position moving the locking linkage means in the closing direction to block movement of the pin away from the crank arm slot end and block movement of the crank arm and concealing means out of the respective open and closed positions, while permitting such movements of the concealing means out of said positions by operation of the actuator.

References Cited

UNITED STATES PATENTS

| | | |
|---|---|---|
| 2,084,120 | 6/1937 | Ames. |
| 2,119,892 | 6/1938 | Snow _____ 240—8.1 XR |
| 2,312,005 | 2/1943 | Smith. |
| 2,457,211 | 12/1948 | De Smet et al. |
| 2,700,725 | 1/1955 | Morphew et al. ___ 240—8.1 XR |

JOHN M. HORAN, Primary Examiner

J. F. PETERS, JR., Assistant Examiner

U.S. Cl. X.R.

240—8.1